United States Patent [11] 3,614,466

| [72] | Inventor | Reed H. Grundy |
| | | Murraysville, Pa. |
| [21] | Appl. No. | 39,801 |
| [22] | Filed | May 22, 1970 |
| [45] | Patented | Oct. 19, 1971 |
| [73] | Assignee | Westinghouse Air Brake Company |
| | | Swissvale, Pa. |

[54] FAIL-SAFE LEVEL DETECTOR WITH 50—50 DUTY CYCLE
24 Claims, 2 Drawing Figs.

[52] U.S. Cl. .................................................. 307/202, 307/235, 307/311, 328/140, 328/150, 330/59
[51] Int. Cl. .................................................. H02h 7/20, H03f 17/00
[50] Field of Search .......................................... 307/311, 202, 235; 328/140, 146, 148, 149, 150; 330/59, 112

[56] References Cited
UNITED STATES PATENTS
| 3,379,991 | 4/1968 | Crerc et al. ................... | 330/59 |
| 3,527,986 | 9/1970 | Darrow ........................ | 328/150 X |

FOREIGN PATENTS
| 1,156,110 | 10/1963 | Germany ...................... | 330/59 |

Primary Examiner—Donald D. Forrer
Assistant Examiner—L. N. Anagnos
Attorneys—H. A. Williamson, A. G. Williamson, Jr. and J. B. Sotak ABSTRACT: This invention relates to a fail-safe level detector comprising an amplifier circuit having an input and an output, a feedback loop connected between the output and input for providing an upper and lower hysteresis level and a photosensitive device having a radiant-energy source connected in the feedback loop for monitoring its condition. The photosensitive device also has a photopositive resistive element connected to the input of the amplifier circuit to assume a high-impedance condition whenever the radiant-energy source emits no radiant energy, thereby decreasing the magnitude of the input below the upper and lower hysteresis levels so that the amplifier circuit will not produce an output during a component failure in the feedback loop. Design of the feedback loop to provide equal and opposite upper and lower hysteresis levels provides for an output having a substantially 50—50 duty cycle whenever a periodic waveform having origin symmetry has peak amplitudes exceeding the upper and lower hysteresis levels.

PATENTED OCT 19 1971 3,614,466
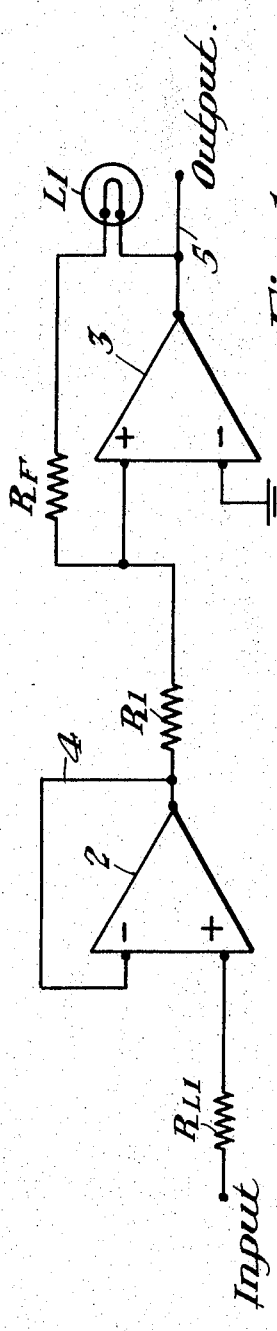
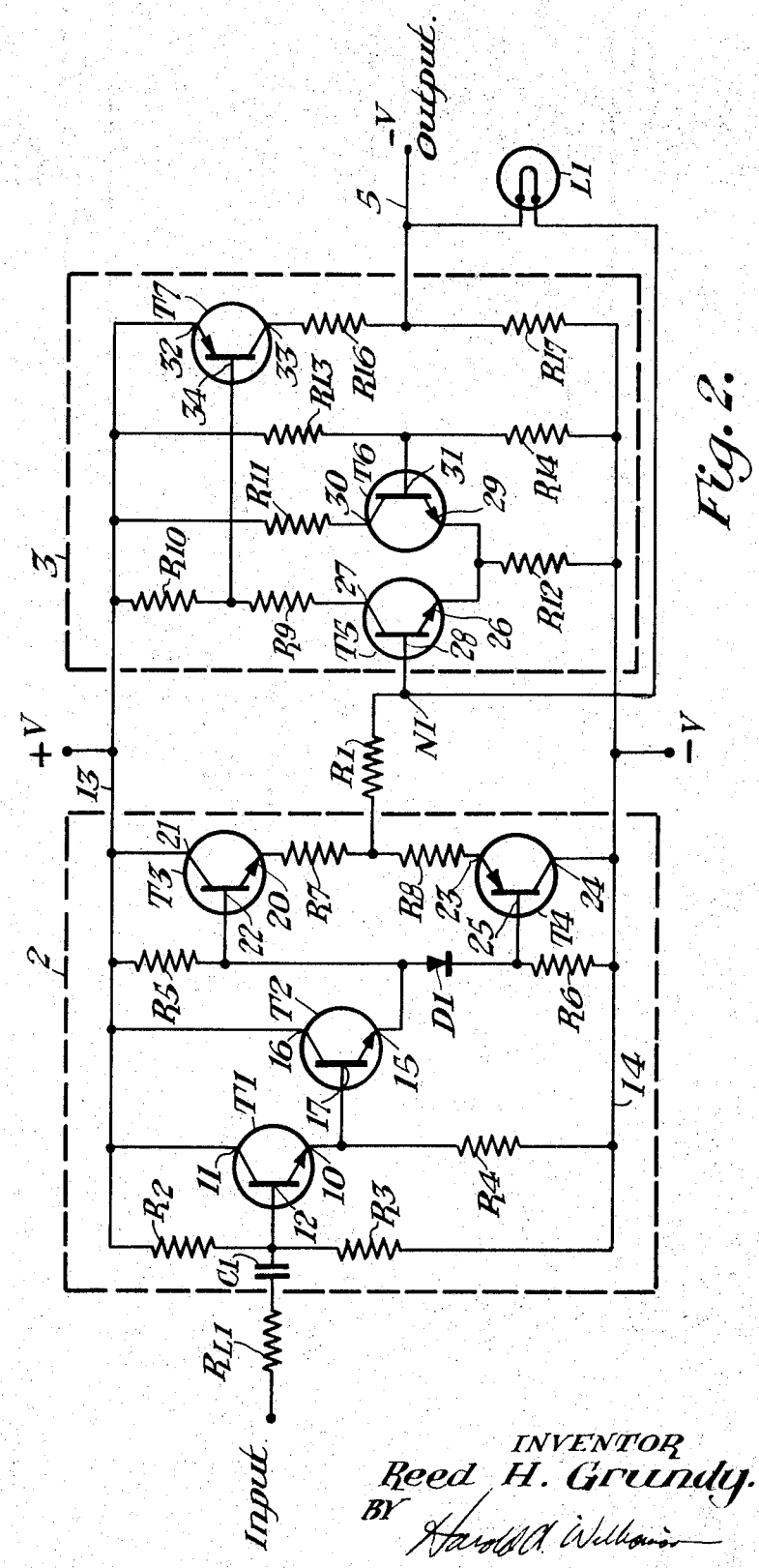
INVENTOR
Reed H. Grundy.
BY Harold A. Williamson
HIS ATTORNEY

FAIL-SAFE LEVEL DETECTOR WITH 50—50 DUTY CYCLE

My invention relates to a fail-safe level detector, and more particularly to an electronic circuit having an upper and a lower hysteresis level which produces an output only after the magnitude of the input exceeds the magnitudes of the upper and lower hysteresis levels and in the absence of a critical circuit or component failure.

In various control systems such as for mass and/or rapid transit operations, it is of the utmost importance to exercise extreme care in designing and constructing certain circuits of the system in order to preclude injury to persons and prevent damage to the equipment. That is, in order to insure the highest degree of safety to individuals as well as apparatus, it is necessary and essential that under no circumstances will a failure cause or be capable of causing a true or valid indication. Accordingly, it is readily evident that the apparatus must operate in a fail-safe manner so that any conceivable failure will result in a condition at least as restrictive and, preferably, more restrictive than that preceding the failure. For example, a circuit malfunction or component failure in a speed control system should not be permitted to erroneously simulate and indicate a condition for holding and maintaining the vehicle speed. It is also mandatory, in an automatic speed control system of this type, to insure that internally or externally generated noise signals should not be capable of producing an erroneous speed command output signal. It has been found that in cab signal territory the magnitude of extraneous signals received from an adjacent track in some cases is sufficient to cause false operation of the vehicle-carried apparatus. Thus, in order to preclude such adverse operation, certain precautionary measures must be employed to render such extraneous signals ineffective when picked up by the inductive coils of the vehicle receiver. One satisfactory method has been to provide an optimum signal-to-noise ratio which requires that any picked up signal must exceed a preselected or predetermined value prior to its acceptance as a true or valid indication. Accordingly, it would merely appear necessary to measure the amplitude of the picked-up signals by a suitable amplitude level detecting circuit. However, previous types of level-detecting circuits were possessed of certain shortcomings which made their use intolerable in the tuned receiver portion of the cab-signaling equipment. For example, prior art level detectors were generally nonvital and/or capable of producing output signals which adversely affected operation of the tuned resonant circuits. This latter condition resulted form the fact that the duty cycles of the output signals of the previous level detectors varied in accordance with the amplitudes of the input signals which in cab-signaling operations can vary from 20 to 1 between the transmitter end and the receiver end of the track section. A review of Fourier analysis will clearly show that the harmonics of any signal are directly proportional to its duty cycle. It will be appreciated that certain frequencies of the harmonics could be improperly passed by one of the tuned resonant circuits previously mentioned. Such an improperly passed signal could, in turn, result in a higher speed command than is actually being received from the track. Accordingly, to eliminate such unwanted operation, it is necessary that any level detector for a coded cab signal application must be insensitive to variations in the amplitudes of any detected signals.

It is therefore an object of my invention to provide a fail-safe level detector the output periodicity of which is insensitive to the amplitude of the detected signals.

A further object of my invention is to provide a fail-safe level detector which has a unity duty cycle.

Another object of my invention is to provide a fail-safe level detector having substantially a 50 percent positive and substantially 50 percent negative duty cycle.

Yet another object of my invention is to provide a fail-safe level detector having an amplifier circuit means including regenerative feedback for providing an upper and a lower hysteresis level.

Still another object of my invention is to provide a fail-safe level detector having a feedback type of amplifier and a monitoring device for checking the condition of the feedback loop.

Still a further object of my invention is to provide an improved differential amplifier having regenerative feedback for setting the level of detectable input signals.

Yet a further object of my invention is to provide a fail-safe level detector having an impedance-matching circuit and a differential amplifier circuit including a feedback path and a photosensitive means for monitoring the condition of the feedback path.

Still yet a further object of my invention is to provide a fail-safe level detecting circuit which is simple in design, reliable in operation, durable in use, and efficient in service.

In the attainment of the foregoing objects a fail-safe level detector has been invented. The fail-safe level detector embodied herein comprises an impedance-matching circuit having an input and an output, an amplifying circuit means having an input and an output, a feedback loop, and a photosensitive means. The amplifying circuit means input is electrically connected to the output of the impedance-matching circuit via a resistor. It has a differential amplifier stage which includes a positive input terminal and a negative input terminal and the amplifying circuit also has a switching stage. The differential amplifier stage of the amplifying circuit composes a first and a second transistor each having an emitter electrode, a collector electrode, and a base electrode. The base electrode of the first transistor is the positive input terminal of the differential amplifier stage. The collector electrode of the first transistor is electrically connected to a preselected positive saturation voltage potential through series-connected first and second resistors. The collector electrode of the second transistor is electrically connected to the positive voltage potential through a third resistor. The emitter electrodes of the first and second transistors are electrically connected to a preselected negative saturation voltage potential through a common fourth resistor, and the base electrode of the second transistor is the negative input terminal of the differential amplifier stage and is electrically connected to the junction of a voltage divider network consisting of fifth and sixth resistors. The voltage divider network is connected across both the positive and negative voltage potentials.

The switching stage of the amplifying circuit means composes a third transistor having an emitter electrode, a collector electrode and a base electrode. The base electrode of the third transistor is directly connected to the junction of the first and second resistors. The emitter electrode of the third transistor is connected directly to the positive voltage potential. The collector electrode of the third transistor is connected to the negative voltage potential through series-connected seventh and eighth resistors. The output of the amplifying circuit means is taken from the junction of the seventh and eighth resistors.

The feedback loop is connected between the output of the amplifying circuit means and the input of the differential amplifier stage. It provides an upper and lower hysteresis level.

The photosensitive means has a lamp connected in the feedback loop for monitoring the condition thereof. It also has a photosensitive resistor connected to the input of the impedance-matching circuit and responsive to the lamp. The photosensitive element assumes a high-impedance condition whenever the lamp emits no light, thereby decreasing the magnitude of the input to said impedance-matching circuit below the upper and lower hysteresis levels so that the amplifying circuit means is incapable of producing an output during a component failure in the feedback loop.

For a more complete understanding of my invention as well as realizing other objects and advantages therefrom, reference is made to the following detailed description taken in conjunction with the accompanying drawings in which:

FIG. 1 is a schematic diagram in substantially block from illustrating the fail-safe level detector embodying the present invention.

FIG. 2 is a schematic circuit diagram illustrating the details of the embodiment of FIG. 1.

Referring now to the drawings, and particularly to FIG. 1, there is shown a fail-safe level detecting circuit in accordance with my invention. As shown, the level detector is a multistage device including an impedance-matching circuit 2 and a feedback-amplifying device 3. It will be noted that the input to the detecting circuit is applied to the positive terminal of the impedance-matching circuit 2 through a photosensitive resistor $R_{L1}$, the purpose of which will be described in detail hereinafter. The output from the impedance-matching circuit 2 is applied to the positive terminal of the feedback amplifier 3 through a resistor R1. It will be noted that a portion of the output from the impedance-matching circuit 2 is applied to its negative terminal via lead 4 to provide negative or degenerative feedback. As shown, the negative terminal of the feedback amplifier 3 is connected to a point of reference such as ground. The output from feedback amplifier 3 is derived via lead 5. A portion of that output is fed back through a light source or lamp L1 and resistor $R_F$ to the positive terminal of the feedback amplifier 3. It will be appreciated that the resistor $R_F$ may, in fact, be the internal resistance of the lamp L1 or may be some separately added resistance if necessary.

It has been found that by employing a positive feedback type of differential amplifier and by selecting a proper relation between the feedback and the input resistance values, one can create a level detector which is insensitive to the amplitudes of detectable input signals. That is, the differential amplifier may be designed with built-in hysteresis which insures that a unity duty cycle, namely, a 50 percent positive and a 50 percent negative output signal will be produced after application of a sufficient level of a periodic input signal possessing origin symmetry. However, the necessary fail-safeness of such a circuit arrangement can be achieved only when special precautionary measures are taken to insure the integrity of the feedback loop. For example, should the feedback circuit of amplifier 3 become open-circuited infinite impedance would result and the intrinsic hysteresis would be destroyed so that the level-detecting ability of the circuit no longer exists. That is, all input signal levels would be passed by the differential amplifier. In order to prevent such unsafe amplifier operation it is therefore necessary to monitor, or check the presence of a feedback signal, and in the absence of the feedback signal to initiate an input signal loading action. Thus, by employing a photosensitive monitoring device such as lamp L1 and the photopositive input resistor $R_{L1}$ fail-safe operation may be realized. For example, the opening of the feedback loop causes lamp L1 to extinguish, which thereby removes the radiation from photosensitive resistor $R_{L1}$. This removal of radiant energy effectively causes the resistor $R_{L1}$ to assume its high-impedance condition. Thus, an extremely large input impedance is presented to the input signals so that they are all effectively blocked and accordingly, no erroneous output signal can appear on lead 5. Hence, integrity of the circuit is insured and its fail-safeness is secured.

Turning now to FIG. 2 there are shown the specific elements or components of the level detector of FIG. 1. As in FIG. 1, the periodic input signals which in this case may be sinusoidal in nature are applied to the impedance-matching circuit 2 through photopositive resistor $R_{L1}$ and a coupling capacitor C1. As mentioned above, the photopositive resistor $R_{L1}$ has the inherent characteristics of exhibiting a relatively low impedance when suitable radiant energy such as light impinges upon it, and of assuming a relatively high impedance value when the illuminating rays no longer strike it.

As shown, the impedance matching circuit 2 preferably takes the form of a multistage emitter-follower configuration having less than unity again. The first stage includes an NPN transistor T1 having an emitter electrode 10, a collector electrode 11 and a base electrode 12. The base electrode 12, which is the input terminal of the emitter-follower, is connected to the junction point of a voltage divider network comprising resistors R2 and R3. The upper terminal of resistor R2 is connected to a first common lead 13. The common lead 13 is connected to the positive terminal, +V, of a suitable supply or potential source, not shown. The lower terminal of resistor R3 is connected to a second common lead 14. The common lead 14 is connected to the negative terminal, −V, of the supply source. The collector electrode 11 of a transistor T1 is directly connected to lead 13, while the emitter electrode 10 of transistor T1 is connected to lead 14 via resistor R4. The second stage also includes an NPN transistor T2 having an emitter electrode 15, a collector electrode 16 and a base electrode 17. The base electrode 17 of transistor T2 is directly connected to emitter electrode 10 of transistor T1 and the collector electrode 16 is directly connected to lead 13. The third stage comprises a complementary symmetrical emitter-follower including NPN transistor T3 and PNP transistor T4. The transistor T3 includes an emitter electrode 20, a collector electrode 21 and a base electrode 22, and the transistor T4 includes an emitter electrode 23, a collector electrode 24 and a base electrode 25. A voltage-dividing network including resistor R5, diode D1 and resistor R6 is connected across leads 13 and 14. The base electrode 22 of transistor T3 and the emitter electrode 15 of transistor T2 are connected to the common junction of resistor R5 and the anode of diode D1, while the base electrode 25 of transistor T4 is connected to the common junction of resistor R6 and the cathode of diode D1. The diode D1 is employed for biasing purposes and insures that the transistors T3 and T4 are slightly forwardly biased. The collector electrode 21 of transistor T3 is directly connected to lead 13 and the collector electrode 24 of transistor T4 is directly connected to lead 14. A pair of series-connected load resistors R7 and R8 interconnects the emitter electrodes 20 and 23 of the transistors T3 and T4, respectively. As shown, the output from the complementary symmetrical emitter-follower stage is derived from the junction of resistors R7 and R8, and is applied to the input of feedback amplifier 3 via resistor R1.

As shown, the feedback amplifier takes the form of a differential amplifier stage and a switching stage. The differential amplifier is composed of a pair of NPN transistors T5 and T6. The transistor T5 includes an emitter electrode 26, a collector electrode 27, and a base electrode 28. The base electrode 28 is the positive input terminal as well as the feedback terminal of the amplifier 3. The collector electrode 27 of transistor T5 is connected to the lead 13 through a pair of series-connected resistors R9 and R10. The collector electrode 30 of transistor T6 is connected to lead 13 via resistor R11. The emitter electrodes 26 and 29 of transistors T5 and T6, respectively, share a common resistor R12 which is connected to lead 14. The base electrode 31 of transistor T6, which is the negative input terminal of the amplifier 3 is connected to the junction of a voltage divider network, consisting of resistors R13 and R14, which is connected across leads 13 and 14. The switching stage includes a PNP transistor having an emitter electrode 32, a collector electrode 33, and a base electrode 34. The base electrode 34 is directly connected to the junction of resistors R9 and R10, while the emitter electrode 32 is directly connected to lead 13. A pair of series-connected resistors R16 and R17 connect the collector electrode 33 of transistor T7 to lead 14. In the present instance, the feedback loop or path of the amplifier 3 extends from the junction of resistors R16 and R17 through the lamp L1 to the base electrode 28 of transistor T5. In FIG. 2, the internal resistance of the lamp L1 is equivalent to the separately shown resistor $R_F$ of FIG. 1. It will also be seen that the junction between resistors R16 and R17 operates as the output of the amplifier 3, namely, lead 5 is connected to a suitable output circuit.

Turning now to the operation of the fail-safe level detector circuit, it will be initially assumed that the necessary operating potentials are applied to the circuit, and that the circuit is intact and functions properly. Under this condition, the lamp L1 is illuminated and the radiant energy or light striking resistor $R_{L1}$ causes its resistance thereof to be reduced to a relatively low value. Let it further be assumed that the conductive condition of the differential amplifier is such that the transistor T5 is nonconducting while the transistor T6 is in a conducting state. Under this condition the switching transistor T7 is rendered nonconductive and the lamp L1 is illuminated by power supplied from the negative potential source. Thus, the output voltage is also substantially equal to the negative voltage of terminal −V minus a small voltage drop across resistor R17. It will be appreciated that this quiescent condition will continue until some overriding signal is applied to the input of the level detector. Let us assume that the circuit is in the above condition and that a random-type noise signal having a level less than the hysteresis level appears on the input thereof. Under such a condition the noise signal is passed by the multistaged emitter follower amplifier and appears on the output junction of resistors R7 and R8 of the last emitter-follower stage including transistors T3 and T4. As previously mentioned, the emitter-follower amplifier 2 has a less than unity again so that the magnitude of the output noise signal is substantially equal to the input. Assuming that a positive alternation appears at the junction of resistors R7 and R8, it will be seen that the sum of the currents flowing to and from the node N1 will insure the transistor T5 to be incapable of conducting for any signal level less than the hysteresis level. The feedback current flows from node N1 while the noise current which is less than the feedback current flows toward the node N1. Thus, it is necessary that the difference in current between the feedback and the noise currents will tend to flow from the base electrode 28 to the node N1 so that transistor T5 remains nonconductive and the output condition remains the same. Hence, the voltage level at N1 will be less than the potential level at the base electrode 31 of transistor T6, thereby ensuring the nonconduction of transistor T5. Now, upon the appearance of a negative alternation of an input noise signal, again the amplitude of the output signal at the junction of resistors R7 and R8 will be substantially the same as that of the input noise signal. However, now the noise signal current flows away from node N1 as does the feedback current. Accordingly, since an increased amount of current cannot be supplied by the base electrode 28 to the node N1 during a negative alternation of an input noise signal, the feedback will be slightly reduced by lowering the voltage level at N1. Thus, again the transistor T5 is incapable of conducting and the output condition remains the same.

Let us now assume that a periodic input signal which has peak values exceeding the equal and opposite hysteresis levels of the level detector is applied to the input of the level detector. Under this condition, the output signal appearing at the junction of resistors R7 and R8 will again be substantially the same as that appearing on the input. However, when the amplitude of the positive alternation exceeds the positive hysteresis level the input current flowing to the node N1 will exceed the feedback current flowing from the node N1 so that a given amount of current flows from the node N1 into the base electrode 28 thereby rendering transistor T5 conductive. The conduction is transistor T5 causes the transistor T6 to turn off. The turning on of transistor T5 causes a forward biasing of the base-emitter electrodes 34-32 so that the switching transistor T7 is turned on. The conduction of transistor T7 now causes the output to change from −V saturation to +V saturation.

Conversely, when the magnitude eof the amplitude of the negative alternation of the periodic input signal exceeds the magnitude of the negative hysteresis level, the input current flowing from the node N1 exceeds the feedback current flowing into the node N1 so that the direction of current in the base electrode 28 is reversed for rendering transistor T5 nonconducting and rendering transistor T6 conducting. The nonconduction of transistor T5 causes the switching transistor T7 to turn off. The turning off of the transistor T7 causes the output on lead 5 to shift again to the negative potential −V. It will be appreciated that the output will shift between the two saturation levels, namely, +V and −V, so long as the absolute values of the level of the periodic input exceeds the absolute value of the hysteresis levels of the level detector. Further, it will be appreciated that the differential amplifier is a bistable device which remains in a first condition until triggered to its second condition. That is, transistor T6 will remain conducting until transistor T5 is rendered conductive and vice versa. Accordingly, it will be seen that the transistors alternatively conduct for 50 percent of the duty cycle when the absolute value of the amplitude of the periodic input signal which has origin symmetry exceeds the absolute values of the equal and opposite hysteresis levels. Thus, the output voltage consists of a waveform which is at a positive potential +V for half of the time and at a negative potential −V for the other half of the time.

As previously mentioned, the lamp L1 monitors the condition of the feedback loop of the amplifier and insures that an unsafe failure, namely, an open circuit condition is incapable of reducing the hysteresis levels. For example, an open feedback loop extinguishes the lamp L1 and the lack of illumination upon photopositive resistor $R_{L1}$ causes it to assume a relatively high resistance. Thus, the high input resistance blocks an input signal which could cause an erroneous output signal. It will be appreciated that special precautions are taken to insure that the critical resistive elements of the level detector circuit will not become short circuited. That is, by employing carbon composition types of resistors the possibility of a shorted resistive element is eliminated. Further, it will be appreciated that the opening or shorting of an active element either destroys the necessary amplification qualities of a particular stage or upsets the necessary biasing potentials to an extent where no output is capable of being produced. thus, the level detector operates in a fail-safe manner to provide an output signal when, and only when the peak values of a periodic input are in excess of the preselected absolute values of the hysteresis levels of the level detector.

While my invention has been described with regard to level detectors for cab-signaling applications, it will be understood that the invention may have utility in other systems and unrelated areas remote from mass and/or rapid transit. Further, it will be understood that opposite types of transistors may be employed to those shown simply by reversing the polarity of the diode D1, and the DC supply voltage.

Therefore, it will be appreciated that the foregoing description of my invention is only illustrative and is not intended that the invention be limited thereto. Thus, sundry variations, alterations, and modifications may be made by those skilled in the art without departing from the spirit and scope of my invention.

Having thus described my invention, what I claim is:

1. A fail-safe level detector comprising an amplifying circuit means having an input and an output, said amplifying circuit means having a feedback loop connected between said output and said input for providing an upper and a lower hysteresis level, and a photosensitive means having a radiant-energy source connected in said feedback loop for monitoring the condition thereof and having a photoresistive element connected to said input of said amplifying circuit means and responsive to said radiant-energy source, said photoresistive element assuming a high-impedance condition whenever said radiant-energy source emits no radiant energy to thereby decrease the magnitude of the input below said upper and lower hysteresis level so that said amplifier circuit means is incapable of producing an output during a component failure in said feedback loop, a differential amplifier means having an input and an output, said feedback loop being connected between said output and said input of said differential amplifier means, said photoresistive element being connected to said input of said differential amplifier means.

2. The fail-safe level detector as defined in claim 1, wherein said feedback loop provides regenerative feedback to the input of said amplifying means.

3. The fail-safe level detector as defined in claim 1, wherein said radiant-energy source comprises a light bulb.

4. The fail-safe level detector as defined in claim 1, wherein said photoresistive element comprises a photopositive resistor.

5. The fail-safe level detector as defined in claim 1, wherein an impedance matching circuit means is interposed between said photoresistive means and said input of said amplifier circuit means.

6. The fail-safe level detector as defined in claim 5, wherein said impedance-matching circuit means comprises an emitter-follower amplifying means having less than unity gain.

7. The fail-safe level detector as defined in claim 1, wherein the absolute values of said upper and lower hysteresis levels provided by said hysteresis are equal.

8. The fail-safe level detector as defined in claim 5, wherein a current-limiting resistor electrically couples said impedance-matching circuit means to said amplifying circuit means.

9. The fail-safe level detector as defined in claim 8, wherein said upper and lower hysteresis levels are proportional to the ratio of the impedance of said feedback loop and the impedance of said current-limiting resistor.

10. The fail-safe level detector as defined in claim 7, wherein the input to said amplifying circuit means is a signal having a periodic waveform.

11. The fail-safe level detector as defined in claim 10, wherein the output from said amplifying circuit means is a signal having a periodic waveform.

12. The fail-safe level detector as defined in claim 11, wherein said periodic waveform of said output signal has a 50—50 duty cycle.

13. The fail-safe level detector as defined in claim 11, wherein the waveform of said output signal is a square wave.

14. A fail-safe level detector comprising
  a. an impedance-matching circuit having an input and an output,
  b. an amplifying circuit means having an input and an output, said input of said amplifying circuit means electrically connected to said output of said impedance-matching circuit via a current-limiting resistive element, said amplifying circuit means comprising
    1. a differential amplifier stage having a positive input and a negative input and including in combination a first and a second transistor device each having an emitter electrode, a collector electrode, and a base electrode, the base electrode of said first transistor device being said positive input of said differential amplifier stage, the collector electrode of said first transistor device electrically connected to a preselected positive saturation voltage potential through series-connected first and second resistive elements, the collector electrode of said second transistor device electrically connected to said positive voltage potential through a third resistive element, the emitter electrodes of said first and said second transistor devices electrically connected to a preselected negative saturation voltage potential through a common fourth resistive element, the base electrode of said second transistor device being said negative input of said differential amplifier stage and electrically connected to the junction of a voltage divider network consisting of fifth and sixth resistive elements, said voltage divider network connected across both said positive and said negative voltage potentials, and 2. a switching stage including a third transistor device having an emitter electrode, a collector electrode, and a base electrode, said base electrode of said third transistor device directly connected to the junction of said first and said second resistive elements, said emitter electrode of said third transistor device connected directly to said positive voltage potential, said collector electrode of said third transistor device connected to said negative voltage potential through series-connected seventh and eighth resistive elements, said output of said amplifying circuit means taken from the junction of said seventh and eight resistive elements, and
  c. a feedback loop connected between said output of said amplifier circuit means and said input of said differential amplifier stage for providing an upper and a lower hysteresis level, and
  d. a photosensitive means having a radiant-energy source connected in said feedback loop for monitoring the condition thereof and having a photoresistive element connected to said input of said impedance-matching means and responsive to said radiant-energy source, said photoresistive element assuming a high-impedance condition whenever said radiant-energy source emits no radiant energy to thereby decrease the magnitude of the input to said impedance-matching circuit below said upper and lower hysteresis levels so that said amplifying circuit means is incapable of producing an output during a component failure in said feedback loop.

15. The fail-safe level detector as defined in claim 14, wherein said feedback loop provides regenerative feedback to the input of said amplifying means.

16. The fail-safe level detector as defined in claim 14, wherein, said radiant-energy source comprises a light bulb.

17. The fail-safe level detector as defined in claim 14, wherein said photoresistive element comprises a photopositive resistor.

18. The fail-safe level detector as defined in claim 14, wherein said impedance-matching circuit means comprises an emitter-follower amplifying means having less than unity gain.

19. The fail-safe level detector as defined in claim 14, wherein the absolute values of said upper and lower hysteresis levels provided by said hysteresis are equal.

20. The fail-safe level detector as defined in claim 14, wherein said upper and lower hysteresis levels are proportional to the ratio of the impedance of said feedback loop and the impedance of said current-limiting resistor.

21. The fail-safe level detector as defined in claim 19, wherein the input to said impedance-matching circuit is a signal having a periodic waveform.

22. The fail-safe level detector as defined in claim 21, wherein the output from said amplifying circuit means is a signal having a periodic waveform.

23. The fail-safe level detector as defined in claim 22, wherein said periodic waveform of said output signal has a 50——50 duty cycle.

24. The fail-safe level detector as defined in claim 22, wherein the waveform of said output signal is a square wave.